(12) United States Patent
Kabra et al.

(10) Patent No.: US 11,675,838 B2
(45) Date of Patent: Jun. 13, 2023

(54) AUTOMATICALLY COMPLETING A PIPELINE GRAPH IN AN INTERNET OF THINGS NETWORK

(71) Applicant: INTERNATIONAL BUSINESS MACHINES CORPORATION, Armonk, NY (US)

(72) Inventors: Namit Kabra, Hyderabad (IN); Ritesh Kumar Gupta, Hyderabad (IN); Yannick Saillet, Stuttgart (DE); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/302,728

(22) Filed: May 11, 2021

(65) Prior Publication Data
US 2022/0365973 A1 Nov. 17, 2022

(51) Int. Cl.
| | | |
|---|---|---|
| G06F 16/901 | (2019.01) | |
| G06F 11/36 | (2006.01) | |
| G06N 5/022 | (2023.01) | |
| G06N 3/08 | (2023.01) | |
| G06F 18/21 | (2023.01) | |

(52) U.S. Cl.
CPC ...... *G06F 16/9024* (2019.01); *G06F 11/3684* (2013.01); *G06F 11/3692* (2013.01); *G06F 18/217* (2023.01); *G06N 3/08* (2013.01); *G06N 5/022* (2013.01)

(58) Field of Classification Search
CPC ............ G06F 16/9024; G06F 18/217; G06F 11/3684; G06F 11/3692; G06N 3/08; G06N 5/022; G06N 3/042; G06N 5/04; G06N 20/00

USPC .......................................................... 707/798
See application file for complete search history.

(56) References Cited

U.S. PATENT DOCUMENTS

| | | | |
|---|---|---|---|
| 7,805,456 B2 | 9/2010 | Meijer | |
| 7,974,714 B2 | 7/2011 | Hoffberg | |
| 2008/0189277 A1* | 8/2008 | Meijer | ................ G06F 16/2423 |
| 2016/0092474 A1 | 3/2016 | Stojanovic | |
| 2016/0092475 A1* | 3/2016 | Stojanovic | .......... G06F 3/04883 |
| | | | 707/805 |
| 2017/0060574 A1 | 3/2017 | Malladi | |
| 2018/0052897 A1* | 2/2018 | Namarvar | ................ G06F 8/10 |
| 2018/0074786 A1* | 3/2018 | Oberbreckling | ........ G06F 16/25 |

(Continued)

FOREIGN PATENT DOCUMENTS

JP 2010518516 A 5/2010

*Primary Examiner* — Evan Aspinwall
(74) *Attorney, Agent, or Firm* — Schmeiser, Olsen & Watts, LLP; David Mattheis

(57) ABSTRACT

An approach is provided for completing a pipeline graph. Using a deep learning based sequence model, an initial data pipeline having a sequence of nodes is generated. Mismatch (es) between data formats required by input and output in the sequence of nodes is identified. Virtual gap node(s) that correct the mismatch(es) are added to the initial data pipeline. For a given virtual gap node, tentative graph structures are determined using knowledge graphs and a crowd sourced validation system. Reuse forecast scores and performance scores for the tentative graph structures are calculated. Based on the reuse forecast scores and the performance scores, a final graph structure for implementing the given virtual gap node is determined.

17 Claims, 4 Drawing Sheets

(56) References Cited

U.S. PATENT DOCUMENTS

| | | |
|---|---|---|
| 2020/0133255 A1 | 4/2020 | Cella |
| 2020/0151619 A1 | 5/2020 | Mopur |
| 2020/0327371 A1 | 10/2020 | Sharma |

* cited by examiner

AUTOMATICALLY COMPLETING A PIPELINE GRAPH IN AN INTERNET OF THINGS NETWORK

BACKGROUND

The present invention relates to data pipeline graphs, and more particularly to completing pipeline graphs to match formats of a sensor stream in an Internet of Things (IoT) network.

A data pipeline or an extract, transform, and load (ETL) pipeline is a set of processes that extract data from a source of input, transform the extracted data, and load the transformed data into an output destination (e.g., a database or data warehouse). The data pipeline includes a set of data processing nodes connected in a series in which the output of one node becomes the input of the next node. The source of input for the data pipeline may be data from IoT devices in an IoT network.

SUMMARY

In one embodiment, the present invention provides a computer-implemented method. The method includes generating, by one or more processors and by using a deep learning based sequence model, an initial data pipeline having a sequence of nodes. The method further includes identifying, by the one or more processors, one or more mismatches between data formats required by input and output in the sequence of nodes included in the initial data pipeline. The method further includes in response to the identifying the one or more mismatches, adding one or more virtual gap nodes to the initial data pipeline. The one or more virtual gap nodes correct the one or more mismatches. The method further includes for a given virtual gap node included in the one or more virtual gap nodes, determining, by the one or more processors, tentative graph structures using knowledge graphs and a crowd sourced validation system and calculating, by the one or more processors, reuse forecast scores and performance scores for the tentative graph structures. The method further includes based on the reuse forecast scores and the performance scores, determining, by the one or more processors, a final graph structure for implementing the given virtual gap node.

A computer program product and a computer system corresponding to the above-summarized method are also described and claimed herein.

DETAILED DESCRIPTION

Overview

In IoT networks, new sensors are added and/or deleted in a dynamic manner. The IoT networks stream data to an analytics cloud which has artificial intelligence (AI) models (e.g., machine learning models) to train and predict. This raw data being streamed cannot be fed directly to the AI models because the raw data needs to be processed into a format which the AI models are able to consume. To enable the feeding of the aforementioned raw data to the AI models, steps are added to a data pipeline to address the gap between the data format of the raw data and the data format that is expected by the AI model. When many new data streams from IoT networks are being received in a dynamic manner, it becomes difficult to manually write data pipelines to address the aforementioned gap between data formats.

Embodiments of the present invention address the aforementioned unique challenges of pipeline graph completion by providing an approach that automatically completes pipeline graphs to match data formats of an IoT sensor stream with expected data formats of AI models by discovering nodes needed in the pipeline graph, where the nodes include one or more nodes retrieved from a pipeline repository (i.e., coded node(s) or known block(s)) and one or more nodes that are not in the pipeline repository (i.e., uncoded node(s) or unknown block(s)). In one embodiment, the pipeline graph completion system fetches the coded node(s) from the pipeline repository, which stores a set of predefined pipelines and their schemas. In one embodiment, the pipeline graph completion system automatically creates an incentive program using a crowd sourced forum by which developers (i.e., software developers) submit code for the uncoded node(s). A developer whose submitted code is tested and validated is awarded the incentive. In one embodiment, the pipeline graph completion system automatically determines the amount of an incentive based on (i) the importance of mapping the data format of the input sensor stream to the data format of the AI model and (ii) a reuse forecast score.

System for Automatically Completing a Pipeline Graph

Figure 1:
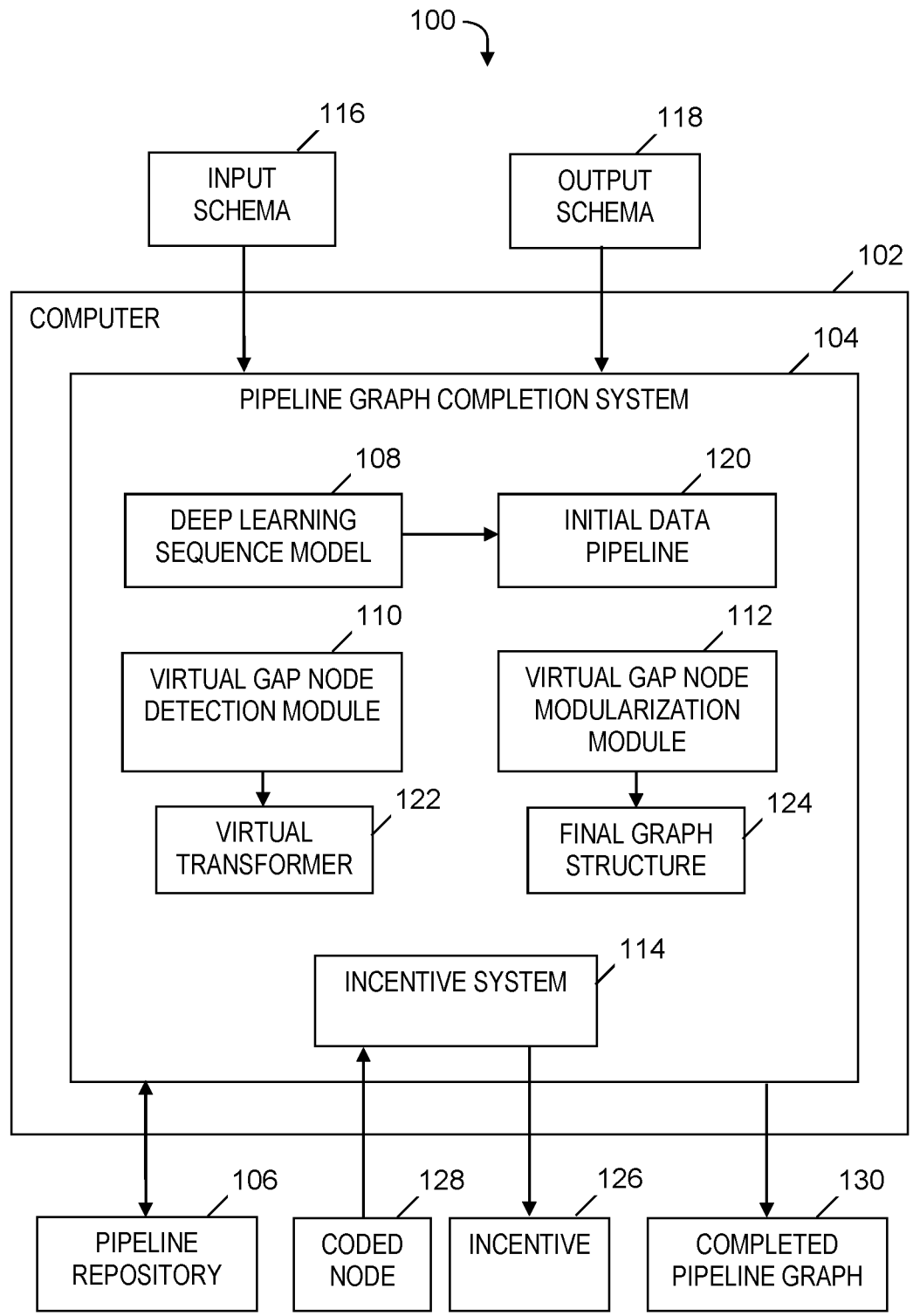
FIG. 1 is a block diagram of a system for automatically completing a pipeline graph, in accordance with embodiments of the present invention.

FIG. 1 is a block diagram of a system 100 for automatically completing a pipeline graph, in accordance with embodiments of the present invention. System 100 includes a computer 102 that includes a software-based pipeline graph completion system 104 which is operatively coupled to a pipeline repository 106. Pipeline graph completion system 104 includes a deep learning sequence model 108, a virtual gap node detection module 110, a virtual gap node modularization module 112, and an incentive system 114.

Pipeline graph completion system 104 receives an input schema 116 and an output schema 118 for a pipeline graph to be completed. In one embodiment, the input schema 116 specifies the data format required by an input sensor stream of an IoT device and the output schema 118 specifies the data format required by an AI model. Using deep learning sequence model 108 and predefined pipelines and their schema stored in pipeline repository 106, pipeline graph completion system 104 generates an initial data pipeline 120 that has a sequence of nodes.

Using the virtual gap node detection module 110, pipeline graph completion system 104 detects incompatible consecutive nodes in the sequence of nodes (i.e., a first node immediately followed by a second node) by detecting that a data format specified by the output schema of the first node does not match a data format specified by the input schema of the second node. Virtual gap node detection module 110 generates a virtual transformer 122 to correct the aforementioned mismatch between data formats.

Virtual gap node modularization module 112 determines tentative (i.e., possible) graph structures for virtual transformer 122, determines reuse forecast scores and performance scores for the tentative graph structures, and ranks the tentative graph structures based on the reuse forecast scores and performance scores. Virtual gap node modularization module 112 identifies a final graph structure 124 for virtual transformer 122 as being the top ranked graph structure among the ranked tentative graph structures.

Pipeline graph completion system 104 triggers the incentive system 114 to implement each node in the final graph structure 124. Incentive system 114 sends a notification that specifies code needed to implement the node(s) in final graph structure 124 and describes incentive(s) to be provided to a developer(s) who develop the needed code. In one embodiment, incentive system 114 sends the notification to crowd sourced developers via code forums (not shown). Based on an importance of mapping the input sensor stream to the AI model and further based on the reuse forecast scores, incentive system 114 automatically determines a monetary amount of an incentive 126 offered to the developers to develop a coded node 128 (i.e., the code for a node in final graph structure 124). If necessary, incentive system 114 determines similar incentives and offers the incentives the developers to develop other node(s) in final graph structure 124.

The aforementioned processing by the components of pipeline graph completion system 104 is repeated for any other virtual transformer generated by virtual gap node detection module 110 so that final graph structure(s) are generated for each of the virtual transformer(s). By using coded node 128 and any other coded node received for node(s) in other final graph structure(s), pipeline graph completion system 104 generates a completed pipeline graph 130.

Figure 2:
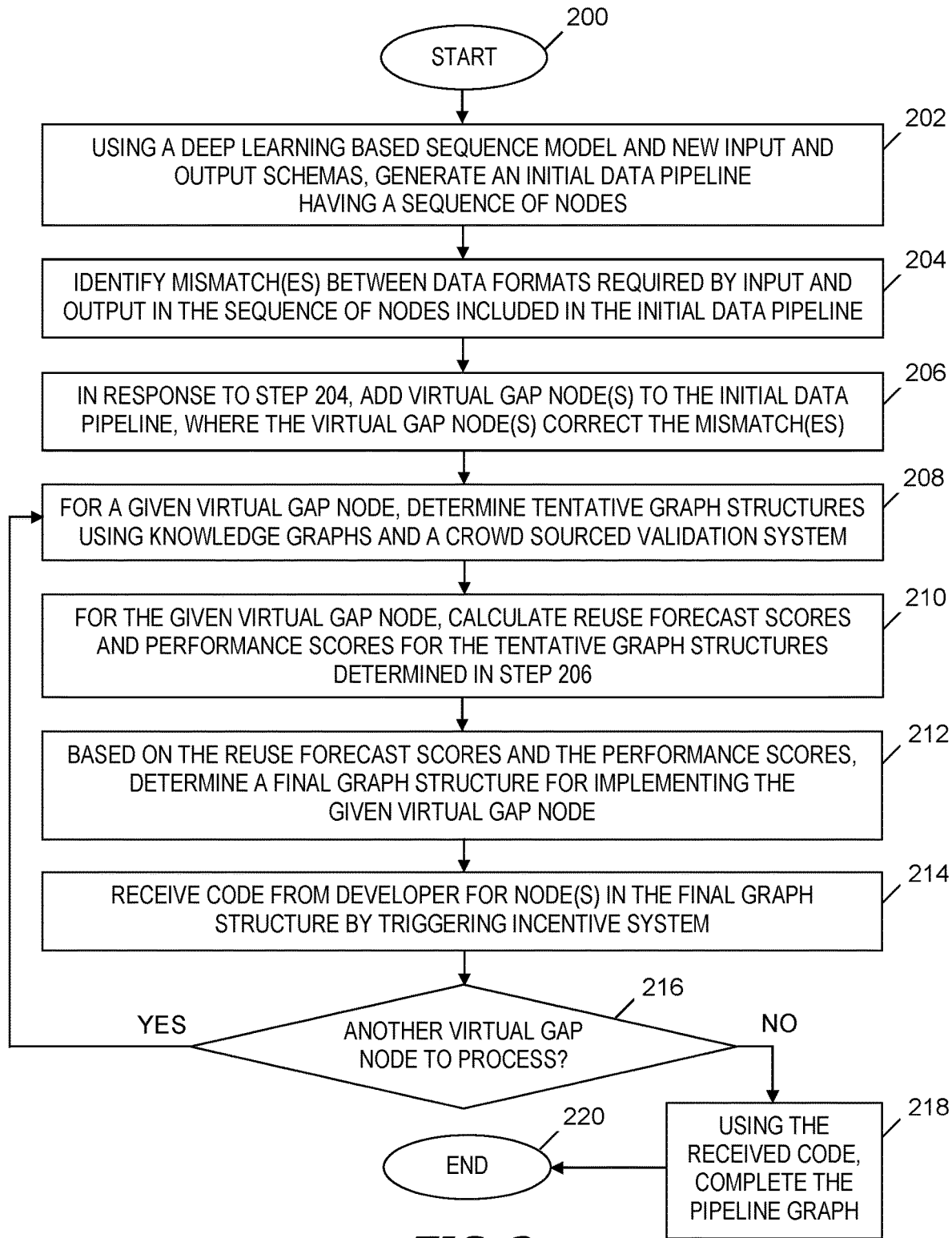
FIG. 2 is a flowchart of a process of automatically completing a pipeline graph, where the process is implemented in the system of FIG. 1, in accordance with embodiments of the present invention.
Figure 3:
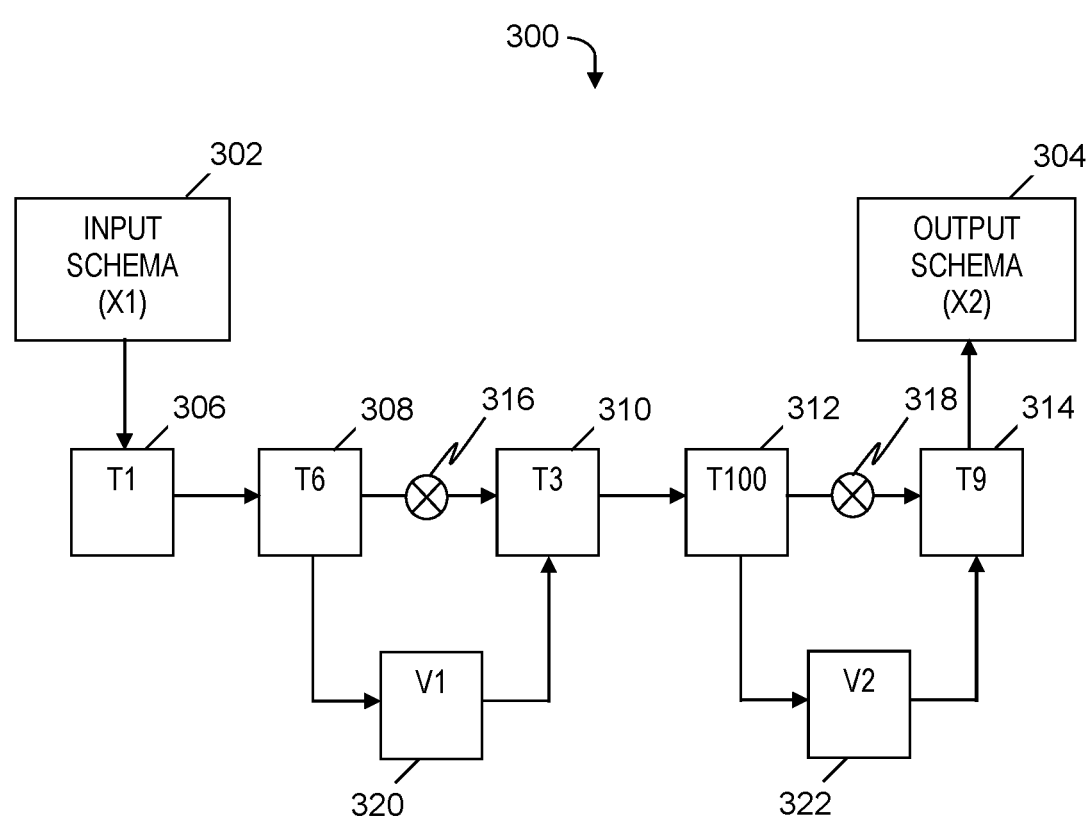
FIG. 3 is an example of detecting virtual gap nodes within the process of FIG. 2 and using the system of FIG. 1, in accordance with embodiments of the present invention.
Figure 4:
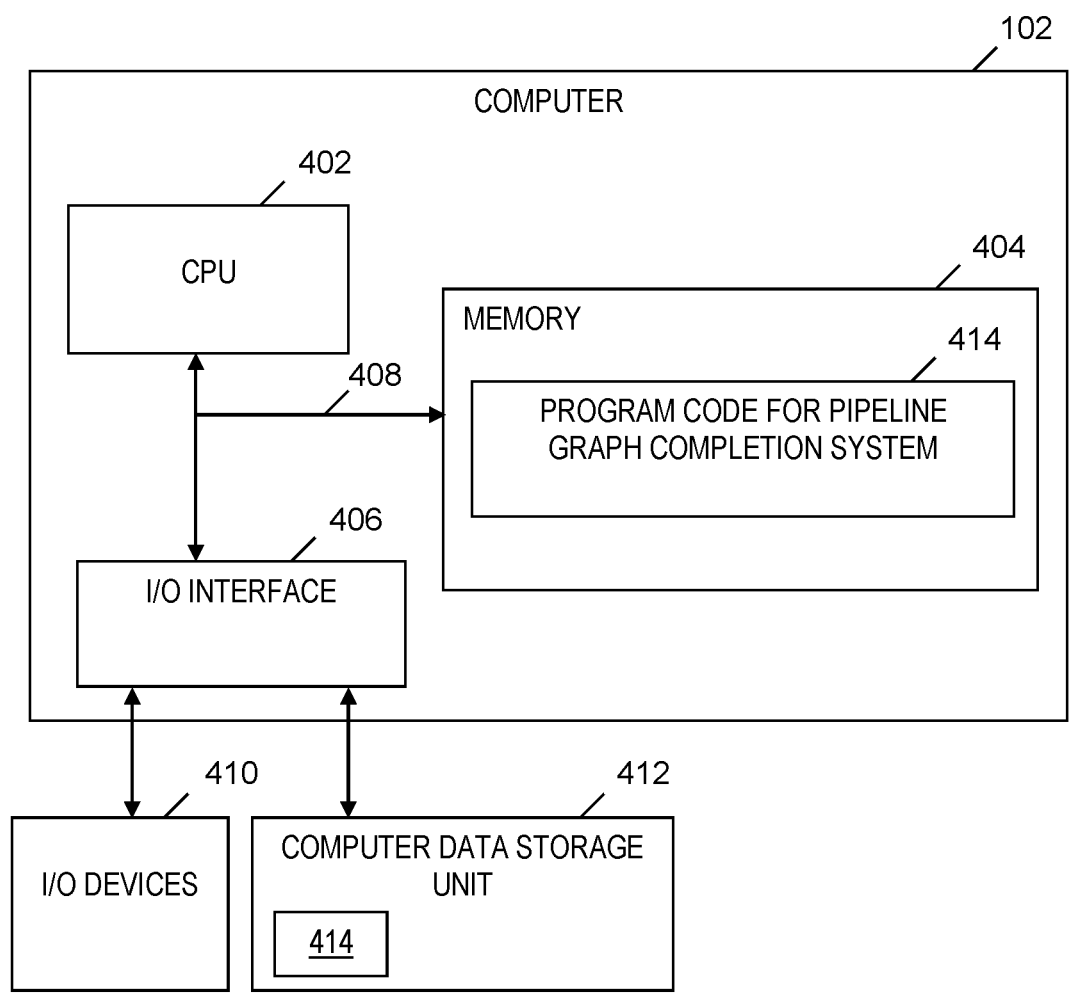
FIG. 4 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2, FIG. 3, and FIG. 4 presented below.

Process for Automatically Completing a Pipeline Graph

FIG. 2 is a flowchart of a process of automatically completing a pipeline graph, where the process is implemented in the system of FIG. 1, in accordance with embodiments of the present invention. The process of FIG. 2 begins at a start node 200. Prior to step 202, pipeline graph completion system 104 (see FIG. 1) receives input schema 116 (see FIG. 1) and output schema 118 (see FIG. 1). Every field in input schema 116 (see FIG. 1) and output schema 118 (see FIG. 1) points to a canonical field, which is predefined by an organization. Each canonical field has a name and a description that explains the semantic meaning of the values contained in the field. Examples of canonical fields include:

CUST_ID: customer unique identifier number
LOCATION_ID: location identifier
AVG_SALES: average sales grouped by CUST_ID
LOC_AVG_SALES: average sales grouped by LOCATION_ID In one embodiment, input schema 116 (see FIG. 1) and output schema 118 (see FIG. 1) are dataframe schema provided by the pandas software library and PySpark computing framework. For example, input schema 116 (see FIG. 1) can be represented as DataFrame(CUST_ID, LOCATION_ID, AVG_SALES) and output schema 118 (see FIG. 1) can be represented as DataFrame(CUST_ID, LOCATION_ID, LOC_AVG_SALES). As used herein, a schema is designed to use only canonical fields, thereby making the schema data independent. For example, a first database can have customer_id and a second database can have uid, but both customer_id and uid refer to the same CUST_ID in canonical space. The differences in the databases are abstracted out by mapping the fields to the canonical fields.

Prior to step 202, pipeline graph completion system 104 (see FIG. 1) trains deep learning sequence model 108 via a recurrent neural network (RNN) or bidirectional encoder representations from transformers (BERT).

In step 202, using the trained deep learning based sequence model 108 (see FIG. 1), input schema 116 (see FIG. 1), and output schema 118 (see FIG. 1), pipeline graph completion system 104 (see FIG. 1) generates a sequence of nodes (i.e., a sequence of transformers), which constructs initial data pipeline 120 (see FIG. 1). Pipeline graph completion system 104 (see FIG. 1) selects the transformers in this AI generated pipeline (i.e., initial data pipeline 120) from a known set of transformers. As used herein, a transformer and a data pipeline (e.g., initial data pipeline 120 in FIG. 1) that includes the transformer, work on schema defined with canonical fields so that the transformer and data pipeline are independent of the data. The transformer defines its valid input and output schema in canonical forms which are saved in pipeline repository 106 (see FIG. 1).

In step 204, virtual gap node detection module 110 (see FIG. 1) checks the compatibility between consecutive nodes in the sequence of nodes in initial data pipeline 120 (see FIG. 1). In step 204, virtual gap node detection module 110 (see FIG. 1) identifies mismatch(es) between data formats required by input and output schemas of the consecutive nodes in the sequence of nodes in initial data pipeline 120 (see FIG. 1). In one embodiment, step 204 includes virtual gap node detection module 110 (see FIG. 1) detecting a mismatch between data formats by performing a schema validation that determines whether the output schema of a transformer matches the input schema of the next transformer.

In step 206, in response to the identification of mismatch(es) between data formats in step 204, virtual gap node detection module 110 (see FIG. 1) adds virtual gap node(s) (i.e., virtual transformer(s)) to correct the identified mismatch(es) (e.g., a virtual transformer to convert a first data format to a second data format, where the first data format is used by the output of a first node in the sequence of nodes and the second data format is required as input to a second node in the sequence of nodes, and where the first and second nodes are consecutive nodes in initial data pipeline 120 (see FIG. 1).

In steps 208, 210 and 212, pipeline graph completion system 104 (see FIG. 1) determines a correct level of module refactoring by splitting a virtual gap node (i.e., virtual transformer 122 in FIG. 1) into a graph, where each node in the graph can be used in other use-cases. In step 208, for a given virtual gap node (e.g., virtual transformer 122 in FIG. 1) in the virtual gap node(s) added in step 206, virtual gap node modularization module 112 (see FIG. 1) determines tentative graph structures using knowledge graphs and a crowd sourced validation system.

In step 210, for the given virtual gap node, virtual gap node modularization module 112 (see FIG. 1) calculates (i) reuse forecast scores for the tentative graph structures determined in step 208 and (ii) performance scores for the tentative graph structures determined in step 208.

In step 210, virtual gap node modularization module 112 (see FIG. 1) calculates a reuse forecast score for a tentative graph structure based on a count of the number of developers who have a need for a component specified by the tentative graph structure, where the need is for a purpose other than the purpose of the pipeline graph being completed by the process of FIG. 2. In one or more embodiments, virtual gap node modularization module 112 (see FIG. 1) determines the count of the number of developers having a need for the aforementioned component by using an explicit or implicit voting scheme.

In one embodiment, an automated voting system included in virtual gap node modularization module 112 (see FIG. 1) provides an explicit voting scheme by conducting and gathering results from online polls in which developers submit votes, where a given vote indicates whether or not the developer who submitted the vote has a need for the aforementioned component. Virtual gap node modularization module 112 (see FIG. 1) receives the results of the explicit voting scheme (i.e., the number of developers who have a need for the component) and uses the received results as the basis for the reuse forecast score (e.g., by converting the number of developers having the aforementioned need to a reuse forecast score based on the number of developers being in a predetermined range of numbers of votes that has a predetermined correspondence to a particular reuse forecast score).

In one embodiment, virtual gap node modularization module 112 (see FIG. 1) provides an implicit voting scheme by analyzing (i) requirement logs from an Internet hosting provider that provides collaborative version control in software development (e.g., requirement logs from GitHub® pages) or (ii) feature requirement logs from a business communication platform that provides persistent chat (e.g., feature requirement logs from the Slack® communication platform). GitHub is a registered trademark of GitHub, Inc. located in San Francisco, Calif. Slack is a registered trademark of Slack Technologies, Inc. located in San Francisco, Calif.

Prior to step 210, virtual gap node modularization module 112 (see FIG. 1) enables respective performance profiles for the tentative graph structures. The performance scores calculated in step 210 are based on the performance profiles. A performance profile indicates a performance of a formed pipeline and different pipelines can be compared by comparing their respective performance profiles.

In one embodiment, a performance profile for a given tentative graph structure includes one or more of the following measures of system performance parameters: CPU usage, memory usage, graphics processing unit (GPU) usage, and battery usage. Alternatively, measures of other system performance parameters can be included in a performance profile.

In one embodiment, virtual gap node modularization module 112 (see FIG. 1) calculates a performance score for a given tentative graph structure by assigning predefined weights to the values of the system performance parameters in the performance profile of the given tentative graph structure and adding the weighted values of the system performance parameters. Alternatively, virtual gap node modularization module 112 (see FIG. 1) calculates a performance score by using another function that combines the values of the system performance parameters included in the performance profile.

Subsequent to step 210 and prior to step 212, virtual gap node modularization module 112 (see FIG. 1) ranks the tentative graph structures based on the reuse forecast scores and the performance scores calculated in step 210 and identifies the top ranked graph structure among the tentative graph structures. In step 212, based on the ranking that uses the reuse forecast scores and the performance scores, virtual gap node modularization module 112 (see FIG. 1) determines that final graph structure 124 (see FIG. 1) is the top ranked graph structure among the tentative graph structures. Final graph structure 124 (see FIG. 1) specifies the code that is needed to implement the given virtual gap node.

In step 214, pipeline graph completion system 104 (see FIG. 1) receives code from developer(s) for node(s) in final graph structure 124 (see FIG. 1) by triggering incentive system 114 (see FIG. 1) to implement each node in final graph structure 124 (see FIG. 1) separately. The triggering of incentive system 114 (see FIG. 1) includes sending notifications to crowd sourced developers via code forums. A given notification describes a node in final graph structure 124 (see FIG. 1) that needs to be implemented and incentive 126 (see FIG. 1) to be provided to the developer who provides the implementation of the node as coded node 128 (see FIG. 1).

Also in step 214, for each of the nodes in final graph structure 124 (see FIG. 1), incentive system 114 (see FIG. 1) determines the corresponding reuse forecast score and a corresponding measure of the importance of mapping the input sensor stream specified by input schema 116 (see FIG. 1) to the AI model specified by output schema 118 (see FIG. 1). Based on the aforementioned reuse forecast score and the measure of importance of the mapping, incentive system 114 (see FIG. 1) automatically determines an amount of incentive 126 (see FIG. 1) for the node in final graph structure 124 (see FIG. 1). In one embodiment, the amount of incentive 126 (see FIG. 1) is a monetary amount.

In step 214 and in response to incentive system 114 (see FIG. 1) offering incentive 126 (see FIG. 1) to a developer to develop code for a node in final graph structure 124 (see FIG. 1), pipeline graph completion system 104 (see FIG. 1) receives code from a developer as coded node 128 (see FIG. 1).

Pipeline graph completion system 104 (see FIG. 1) validates the received coded node 128 (see FIG. 1) by running the coded node 128 (see FIG. 1) against test cases. For a coded node that is determined to be valid against the test cases, pipeline graph completion system 104 (see FIG. 1) adds the coded node to pipeline repository 106 (see FIG. 1).

In step 216, pipeline graph completion system 104 (see FIG. 1) determines whether there is another virtual gap node to process in the steps 208, 210, 212, and 214. If pipeline graph completion system 104 (see FIG. 1) determines in step 216 that there is another virtual gap node to process, then the Yes branch of step 216 is taken and the process loops back to step 208 to start processing a next virtual gap node.

Returning to step 216, if pipeline graph completion system 104 (see FIG. 1) determines that there is no other virtual gap node to process, then the No branch of step 216 is taken and step 218 is performed.

In step 218, using the coded node(s) received in one or more performances of step 214, pipeline graph completion system 104 (see FIG. 1) generates completed pipeline graph 130, which includes the nodes in initial data pipeline 120 along with the coded node(s) that implement the virtual gap node(s) added in step 206, where the coded node(s) are received in step 214.

After step 218, the process of FIG. 2 ends at an end node 220.

In one embodiment, after steps 204 and 206, pipeline graph completion system 104 (see FIG. 1) can generate multiple possible pipeline paths for a completed pipeline graph. Pipeline graph completion system 104 performs a top-k sort of the multiple pipeline paths based on attributes of the paths, such as length and virtual gap nodes.

EXAMPLE

FIG. 3 is an example 300 of detecting virtual gap nodes within the process of FIG. 2 and using the system of FIG. 1, in accordance with embodiments of the present invention. Example 300 includes pipeline graph completion system 104 (see FIG. 1) establishing an input node from input schema 302 (i.e., input schema X1) and an output node from output schema 304 (i.e., output schema X2).

In step 202 (see FIG. 2), pipeline graph completion system 104 (see FIG. 1) uses deep learning module sequence model 108 (see FIG. 1) to generate the sequence of nodes 306, 308, 310, 312, and 314 as a sequence of transformers T1, T6, T3, T100, and T9.

In step 204, pipeline graph completion system 104 (see FIG. 1) identifies a first mismatch 316 (i.e., identifies T6 and T3 as incompatible consecutive transformers in the sequence by determining a mismatch between the data format required by the output schema of transformer T6 and the data format required by the input schema of transformer T3). Similarly, pipeline graph completion system 104 (see FIG. 1) identifies a second mismatch 318 (i.e., identifies T100 and T9 as being incompatible consecutive transformers in the sequence by determining a mismatch between the data format required by the output schema of transformer T100 and the data format required by the input schema of transformer T9).

In step 206, pipeline graph completion system 104 (see FIG. 1) (i) adds virtual gap node 320 (i.e., virtual gap node V1) to provide a transformation of data formats to overcome the first mismatch 316 and (ii) adds virtual gap node 322 (i.e., virtual gap node V2) to provide a transformation of data formats to overcome the second mismatch 318.

Computer System

FIG. 4 is a block diagram of a computer that is included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for pipeline graph completion system 104 (see FIG. 1) to perform a method of automatically completing a pipeline graph, where the instructions are executed by CPU 402 via memory 404. CPU 402 may include a single processing unit or processor or be distributed across one or more processing units or one or more processors in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems or a plurality of computer readable storage media in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes one or more known computer readable storage media, where a computer readable storage medium is described below. In one embodiment, computer data storage unit 412 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to automatically complete a pipeline graph. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4. Pipeline repository 106 (see FIG. 1) may be included in computer data storage unit 412.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to automatically completing a pipeline graph. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to automatically complete a pipeline graph. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of automatically completing a pipeline graph.

While it is understood that program code 414 for automatically completing a pipeline graph may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of automatically completing a pipeline graph. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising:
using a deep learning based sequence model, generating, by one or more processors, an initial data pipeline having a sequence of nodes;
identifying, by the one or more processors, one or more mismatches, a given mismatch included in the one or more mismatches indicates that a first data format specified by an output schema of a first node included in two consecutive nodes in the sequence of nodes does not match a second data format specified by an input schema of a second node included in the two consecutive nodes, and the second node following the first node in the sequence of nodes;
in response to the identifying the one or more mismatches, adding to the initial data pipeline, by the one or more processors, one or more virtual gap nodes which correct the one or more mismatches;
for a given virtual gap node included in the one or more virtual gap nodes, determining, by the one or more processors, tentative graph structures using knowledge graphs and a crowd sourced validation system and calculating, by the one or more processors, reuse forecast scores and performance scores for the tentative graph structures;
based on the reuse forecast scores and the performance scores, determining, by the one or more processors, a final graph structure for implementing the given virtual gap node; and
training, by the one or more processors, the deep learning based sequence model, wherein the generating the initial data pipeline includes generating a sequence of transformers using the trained deep learning based sequence model, and wherein the adding the one or more virtual gap nodes includes adding one or more new virtual transformers.

2. The method of claim 1, further comprising:
determining, by the one or more processors, a measure of importance of mapping an input sensor stream to an artificial intelligence (AI) model in a cloud computing system;
determining, by the one or more processors, an amount of an incentive for developers to develop code for one or more nodes in the final graph structure, the amount being based on a reuse forecast score of the final graph structure and the measure of the importance of mapping the input sensor stream to the AI model;
sending, by the one or more processors and using an incentive system, an offer of the incentive to the developers to develop code for the one or more nodes in the final graph structure;
receiving, by the one or more processors, code from a developer for the one or more nodes in the final graph structure as a response to the offer of the incentive;
using test cases, validating, by the one or more processors, the code received from the developer; and
in response to the code being validated, generating, by the one or more processors, one or more coded nodes using the validated code, adding, by the one or more processors, the one or more coded nodes to a pipeline repository, replacing, by the one or more processors, the given virtual gap node with the one or more coded nodes, and sending, by the one or more processors, the incentive to the developer.

3. The method of claim 2, further comprising generating, by the one or more processors, a complete pipeline graph that includes the initial data pipeline and the one or more coded nodes.

4. The method of claim 1, further comprising:
refactoring, by the one or more processors, a virtual gap node into multiple pipeline nodes based on the reuse forecast scores; and
splitting, by the one or more processors, an incentive program provided by the incentive system into multiple incentive programs for the multiple pipeline nodes, respectively.

5. The method of claim 1, wherein the identifying the one or more mismatches includes determining that an output schema of one transformer included in the sequence of transformers does not match an input schema of a next transformer included in the sequence of transformers.

6. The method of claim 1, further comprising:
receiving, by the one or more processors, voting results from an automated voting system in an organization, wherein the calculating the reuse forecast scores is based on the voting results;
determining, by the one or more processors, respective performance profiles for the tentative graph structures, wherein the calculating the performance scores is based on the performance profiles;
ranking, by the one or more processors, the tentative graph structures based on the reuse forecast scores and the performance scores;
determining, by the one or more processors, a top ranked graph structure included in the tentative graph structures based on the ranked tentative graph structures; and
selecting, by the one or more processors, the top ranked graph structure as the final graph structure.

7. The method of claim 1, further comprising:
providing at least one support service for at least one of creating, integrating, hosting, maintaining, and deploying computer readable program code in the computer, the program code being executed by a processor of the computer to implement the generating the initial data pipeline, the identifying the one or more mismatches, the adding to the initial data pipeline the one or more virtual gap nodes, the determining the tentative graph structures, the calculating the reuse forecast scores and the performance scores, the determining the final graph structure and the training the deep learning based sequence model.

8. A computer program product for automatically completing a pipeline graph, the computer program product comprising:
one or more computer readable storage media having computer readable program code collectively stored on the one or more computer readable storage media, the computer readable program code being executed by a central processing unit (CPU) of a computer system to cause the computer system to perform a method comprising:
using a deep learning based sequence model, the computer system generating an initial data pipeline having a sequence of nodes;
the computer system identifying one or more mismatches, a given mismatch included in the one or more mismatches indicates that a first data format specified by an output schema of a first node included in two consecutive nodes in the sequence of nodes does not match a second data format specified by an input schema of a second node included in the two consecutive nodes, and the second node following the first node in the sequence of nodes;
in response to the identifying the one or more mismatches, the computer system adding to the initial data pipeline one or more virtual gap nodes which correct the one or more mismatches;
for a given virtual gap node included in the one or more virtual gap nodes, the computer system determining tentative graph structures using knowledge graphs and a crowd sourced validation system and the computer system calculating reuse forecast scores and performance scores for the tentative graph structures;
based on the reuse forecast scores and the performance scores, the computer system determining a final graph structure for implementing the given virtual gap node; and
the computer system training the deep learning based sequence model, wherein the generating the initial data pipeline includes generating a sequence of transformers using the trained deep learning based sequence model, and wherein the adding the one or more virtual gap nodes includes adding one or more new virtual transformers.

9. The computer program product of claim 8, wherein the method further comprises:
the computer system determining a measure of importance of mapping an input sensor stream to an artificial intelligence (AI) model in a cloud computing system;
the computer system determining an amount of an incentive for developers to develop code for one or more nodes in the final graph structure, the amount being based on a reuse forecast score of the final graph structure and the measure of the importance of mapping the input sensor stream to the AI model;
the computer system sending, by using an incentive system, an offer of the incentive to the developers to develop code for the one or more nodes in the final graph structure;
the computer system receiving code from a developer for the one or more nodes in the final graph structure as a response to the offer of the incentive;
using test cases, the computer system validating the code received from the developer; and
in response to the code being validated, the computer system (i) generating one or more coded nodes using the validated code, (ii) adding the one or more coded nodes to a pipeline repository, (iii) replacing the given virtual gap node with the one or more coded nodes, and (iv) sending the incentive to the developer.

10. The computer program product of claim 9, wherein the method further comprises the computer system generating a complete pipeline graph that includes the initial data pipeline and the one or more coded nodes.

11. The computer program product of claim 8, wherein the method further comprises:
the computer system refactoring a virtual gap node into multiple pipeline nodes based on the reuse forecast scores; and
the computer system splitting an incentive program provided by the incentive system into multiple incentive programs for the multiple pipeline nodes, respectively.

12. The computer program product of claim 8, wherein the identifying the one or more mismatches includes determining that an output schema of one transformer included in the sequence of transformers does not match an input schema of a next transformer included in the sequence of transformers.

13. A computer system comprising:
a central processing unit (CPU);
a memory coupled to the CPU; and
one or more computer readable storage media coupled to the CPU, the one or more computer readable storage media collectively containing instructions that are executed by the CPU via the memory to implement a method of automatically completing a pipeline graph, the method comprising:
using a deep learning based sequence model, the computer system generating an initial data pipeline having a sequence of nodes;
the computer system identifying one or more mismatches, a given mismatch included in the one or more mismatches indicates that a first data format specified by an output schema of a first node included in two consecutive nodes in the sequence of nodes does not match a second data format specified by an input schema of a second node included in the two consecutive nodes, and the second node following the first node in the sequence of nodes;
in response to the identifying the one or more mismatches, the computer system adding to the initial data pipeline one or more virtual gap nodes which correct the one or more mismatches;
for a given virtual gap node included in the one or more virtual gap nodes, the computer system determining tentative graph structures using knowledge graphs and a crowd sourced validation system and the computer system calculating reuse forecast scores and performance scores for the tentative graph structures;

based on the reuse forecast scores and the performance scores, the computer system determining a final graph structure for implementing the given virtual gap node; and the computer system training the deep learning based sequence model, wherein the generating the initial data pipeline includes generating a sequence of transformers using the trained deep learning based sequence model, and wherein the adding the one or more virtual gap nodes includes adding one or more new virtual transformers.

14. The computer system of claim 13, wherein the method further comprises:

the computer system determining a measure of importance of mapping an input sensor stream to an artificial intelligence (AI) model in a cloud computing system;

the computer system determining an amount of an incentive for developers to develop code for one or more nodes in the final graph structure, the amount being based on a reuse forecast score of the final graph structure and the measure of the importance of mapping the input sensor stream to the AI model;

the computer system sending, by using an incentive system, an offer of the incentive to the developers to develop code for the one or more nodes in the final graph structure;

the computer system receiving code from a developer for the one or more nodes in the final graph structure as a response to the offer of the incentive;

using test cases, the computer system validating the code received from the developer; and in response to the code being validated, the computer system (i) generating one or more coded nodes using the validated code, (ii) adding the one or more coded nodes to a pipeline repository, (iii) replacing the given virtual gap node with the one or more coded nodes, and (iv) sending the incentive to the developer.

15. The computer system of claim 14, wherein the method further comprises the computer system generating a complete pipeline graph that includes the initial data pipeline and the one or more coded nodes.

16. The computer system of claim 13, wherein the method further comprises:

the computer system refactoring a virtual gap node into multiple pipeline nodes based on the reuse forecast scores; and the computer system splitting an incentive program provided by the incentive system into multiple incentive programs for the multiple pipeline nodes, respectively.

17. The computer system of claim 13, wherein the identifying the one or more mismatches includes determining that an output schema of one transformer included in the sequence of transformers does not match an input schema of a next transformer included in the sequence of transformers.

* * * * *